United States Patent
Scott et al.

(10) Patent No.: US 8,097,834 B2
(45) Date of Patent: Jan. 17, 2012

(54) LIQUID HEATING VESSELS

(75) Inventors: Michael James Scott, Onchan (GB); Iain Fenna, Peel (GB); Alan Michael George Meeks, Emsworth (GB)

(73) Assignee: Strix Limited, Ronaldsway (IM)

( * ) Notice: Subject to any disclaimer, the term of this patent is extended or adjusted under 35 U.S.C. 154(b) by 1237 days.

(21) Appl. No.: 11/770,290

(22) Filed: Jun. 28, 2007

(65) Prior Publication Data

US 2009/0001070 A1 Jan. 1, 2009

(51) Int. Cl.
*A47J 27/21* (2006.01)
*H05B 1/02* (2006.01)

(52) U.S. Cl. ........ 219/441; 219/438; 219/491; 219/514; 99/331

(58) Field of Classification Search ................ None
See application file for complete search history.

(56) References Cited

U.S. PATENT DOCUMENTS

| | | | | |
|---|---|---|---|---|
| 2,103,560 A * | 12/1937 | Smith et al. | ................ | 219/417 |
| 2,640,907 A * | 6/1953 | Morey | ........................ | 219/433 |
| 2,712,055 A * | 6/1955 | Campbell | .................... | 219/486 |
| 2,896,062 A * | 7/1959 | Kueser | .......................... | 219/441 |
| 3,206,314 A * | 9/1965 | Shinohara et al. | ............ | 426/300 |
| 3,369,105 A * | 2/1968 | Wheeler | ...................... | 219/441 |
| 3,526,863 A | 9/1970 | Vogelsang | | |
| 3,622,925 A | 11/1971 | Rose | | |
| 3,733,568 A | 5/1973 | Prouty et al. | | |
| 3,767,898 A * | 10/1973 | Wells et al. | .................... | 219/441 |
| 4,713,522 A * | 12/1987 | Kimura | ........................ | 219/202 |
| 4,886,955 A * | 12/1989 | Kimura | ........................ | 219/494 |
| 4,982,654 A * | 1/1991 | Bourgeois | .................... | 99/323.3 |
| 5,585,025 A * | 12/1996 | Idland | .......................... | 219/497 |
| 6,121,586 A | 9/2000 | Taylor et al. | ................. | 219/438 |
| 6,153,859 A * | 11/2000 | Taylor et al. | ................. | 219/441 |
| 6,452,501 B1 * | 9/2002 | Tse et al. | ...................... | 340/640 |
| 6,834,160 B1 | 12/2004 | Chen-Lung et al. | | |
| 7,257,321 B2 * | 8/2007 | Kaastra | ......................... | 392/459 |
| 2006/0289467 A1 * | 12/2006 | Reusche et al. | .............. | 219/523 |
| 2007/0000906 A1 * | 1/2007 | Kaastra | .......................... | 219/441 |

FOREIGN PATENT DOCUMENTS

| | | | |
|---|---|---|---|
| DE | 10131995 | 11/2002 | |
| EP | 1233649 | 8/2002 | |
| EP | 1762161 | 3/2007 | |
| EP | 1767128 | 3/2007 | |
| GB | 1356502 | 6/1974 | ........................ 23/20 |
| GB | 2135143 | 8/1984 | |
| JP | 58136941 A * | 8/1983 | |
| WO | WO 99/12393 | 3/1999 | ........................ 3/82 |
| WO | WO 01/47399 | 7/2001 | ........................ 27/21 |
| WO | WO 02/00077 | 12/2001 | ........................ 37/12 |

* cited by examiner

*Primary Examiner* — Joseph M Pelham
(74) *Attorney, Agent, or Firm* — O'Shea Getz P.C.

(57) ABSTRACT

A liquid heating vessel comprising heating means for heating liquid in the vessel, electronic control means, electromagnetic switching means for interrupting or reducing power to the heating means, and temperature sensing means for providing a signal dependent on the temperature of liquid in the vessel to the control means. The control means is arranged to operate the electromagnetic switching means to interrupt or reduce power to the heating means in response to the control means determining that a pre-determined temperature condition has been reached.

33 Claims, 7 Drawing Sheets

LIQUID HEATING VESSELS

CROSS REFERENCE TO RELATED APPLICATIONS

This application is related to pending U.S. patent application Ser. No. 11/770,204 filed on Jun. 28, 2007.

BACKGROUND OF THE INVENTION

1. Field of the Invention

This invention relates to liquid heating vessels, in particular but not exclusively to vessels which are controlled to heat water in various modes of operation.

2. Background Information

It is known to provide liquid heating vessels, for example water boiling vessels, with an electronic control which allows a user to select one of a number of possible modes of operation; for instance heating to a temperature of 80-85° C. which is suitable for coffee; heating to boiling; or keeping a beverage warm. Such electronically controlled vessels can provide an extensive range of possible functions beyond those possible in vessels having a conventional thermo-mechanical control. However, electronic controls are typically significantly more expensive than conventional mechanical controls involving complicated logic circuitry and requiring a number of expensive solid-state components. Consequently such appliances have failed to take off in the market.

It is an aim of the present invention to provide an improved liquid heating vessel.

SUMMARY OF THE INVENTION

When viewed from a first aspect the present invention provides a liquid heating vessel comprising heating means for heating liquid in the vessel provided on the underside of the base of the vessel, electronic control means, electromagnetic switching means for interrupting or reducing power to the heating means, and temperature sensing means for providing a signal dependent on the temperature of liquid in the vessel to the control means, the control means being arranged to operate the electromagnetic switching means to interrupt or reduce power to the heating means in response to the control means determining that a pre-determined temperature condition has been reached.

Thus it will be appreciated that in accordance with the present invention there is provided a liquid heating vessel whose operation is controlled by an electromagnetic switch in combination with an electronic control. This allows the functionality associated with electronic controls to be provided; for example the user can select a desired temperature of heating. Advantageously, however, controlling the heater is achieved through operation of an electromagnetic switch rather than through operation of a solid-state device such as a triac or other switching circuitry which must be rated to switch up to 13 A at a mains voltage of 240V. The Applicant has found that such a hybrid arrangement can allow an electronic control function to be realized more cost-effectively than with a purely electronic control.

The temperature sensing means could be of any suitable type such as: a thermocouple; a thermomechanical switch, for example comprising a snap-acting bimetallic actuator; or any solid-state electronic device that is affected by temperature such as a field-effect transistor or a junction diode. Preferably, however, the temperature sensing means comprises a thermistor since they are relatively inexpensive, robust and can produce an easily measured signal in the required temperature range.

The thermistor may have a positive temperature coefficient of resistance but preferably it has a negative temperature coefficient. The thermistor could comprise a pill-type thermistor as is described in greater detail in WO 99/12393 but preferably a bead thermistor is used.

A single temperature sensor could be employed but in some possible embodiments more than one sensor is provided, e.g. connected in parallel in order to provide an averaged signal.

The temperature sensing means is preferably mounted so that its signal is indicative of the temperature of the liquid being heated in the vessel. For example it could be in the liquid but preferably it is in good thermal contact with the vessel base. For example the sensing means can be bonded to or arranged to bear against the base.

In preferred embodiments the heated base is configured so as at least partially to isolate the temperature sensing means from the heating means. This could for example be achieved by providing means thermal restrictions such as cut-outs or thinned regions in a heat diffuser plate which is in good thermal contact with the heating means in order to disrupt the flow of heat directly from the heating element to the temperature sensing means. Preferably, however, it comprises providing the temperature sensing means on or against a sensing region of the heated base which is either not provided with a heat diffuser or which has a heat diffuser portion which is not connected to the main diffuser plate in good thermal contact with the element.

Preferably, the sensing region is at least partly surrounded by a wall which could be separately attached or, preferably, defined by a channel on the liquid side of the heater. This further enhances isolation between the sensor and causes the temperature seen by the sensor to match the liquid temperature more closely. In accordance with the invention the control means receives a signal dependent on the temperature of the liquid in the vessel and determines from that signal whether the temperature has reached a pre-determined temperature condition. Any pre-determined temperature condition might be used depending on the desired function. To give a simple example, the pre-determined temperature condition could be that an absolute temperature value is reached. A user may, for example, set the electronic control to determine when the water has reached a given temperature, for example 80° C. suitable for brewing a beverage such as coffee. In such embodiments the vessel preferably comprises means for allowing a user to select a preset mode of operation wherein the control determines when the water temperature has reached a preset temperature. This simplifies the user interface and associated electronics as compared to an arrangement in which a free choice of temperature is given. A separate mode for boiling the water is preferably provided. The vessel may have means for selecting a boiling mode although in some preferred embodiments it is configured such that boiling is the default mode if no other is selected. The vessel preferably comprises one or more buttons for selecting the one or more preset modes of operation.

Alternatively or additionally the control may determine when the heater has reached a predetermined overheat temperature such that power is disconnected to the heater to prevent damage. In other words, the described arrangement can provide a safety function for the vessel. In preferred embodiments at least one thermo-mechanical actuator, e.g. a snap-acting bimetallic actuator is provided in order to protect against overheating. This could be in addition to or instead of electronic overheat protection. In some preferred embodiments the predetermined temperature condition comprises a rate of change of temperature. For example, the control means can be configured to determine that boiling is taking place when the rate of temperature rise falls below a threshold value. This has the advantage that boil detection is independent of the actual temperature of boiling (which can vary according to atmospheric pressure or certain substances dissolved in the water).

Alternatively or additionally the control may determine when the rate of change of temperature of the heater rises above a threshold value indicative of the heater boiling dry.

In general however the pre-determined temperature condition may include a higher order derivative of temperature, or any other temperature condition.

Any of the above-mentioned modes may be achieved by a single heater. For example different brewing and boiling modes can be achieved by controlling the amount of heating which takes place both before and after power to the heating means has been interrupted or reduced. Power reduction could be effected by reducing the voltage applied to the heater or the duty cycle of periodic bursts of heating. However it may not be desirable to operate a single heater at different powers. For example to do so might complicate the circuitry of the control and increase the component costs involved. Also duty cycling can give rise to problems of electromagnetic interference.

Preferably the base of the vessel is provided with a second, lower power, heating means for keeping liquid in the vessel warm. By providing a further heating means the functionality of the vessel can be increased without making the control unduly complicated.

The second heating means is preferably connected in parallel with the main heating means so that they can be energized independently. For example once the control operates to interrupt or reduce power to the main heating means, power to the second heating means can be maintained without the need for any further switching circuitry. This allows a very simple control for changing the level of heating.

Controlling the supply of power to main and secondary heating means respectively may be carried out completely independently of one another. However the Applicant has devised an elegant and beneficial arrangement in this regard. In preferred embodiments the second heating means is connected electrically in series with the coil of the electromagnetic switching means that controls power to the main heater. By connecting the second, keep warm, heating means in series with the coil of the electromagnetic switching means, the resistance of the second heating means is advantageously and usefully employed as part of the circuitry for determining the appropriate current through the coil, reducing the need for a further, separate, power dissipating resistor. This feature is considered novel and inventive in its own right and thus when viewed from a second aspect the invention provides an assembly for a liquid heating vessel comprising: a first heater for heating liquid in the vessel and a second heater of lower power than the first; the assembly further comprising a control arrangement including electromagnetic switching means for interrupting or reducing the power to the first heating means and comprising a coil for effecting said switching; wherein the second heater is connected electrically in series with said coil.

The second heating means operates at a lower power than the first, main heating means. In some preferred embodiments for example the power output of the main heating means is approximately 3 kW at 240 V AC and the power output of the second heating means is approximately 60 W at 240 V AC. In this example the first heater would have a resistance of approximately 19Ω whereas the second heater has a resistance of approximately 1 kΩ

The current through the coil and the second heater could, during a keep-warm phase, be controlled by thermo-mechanical means such as a bimetallic actuator or strip. Preferably however the current is controlled by current regulating means responsive to a signal from the electronic control. This could give a variable current or could effectively act as a switch. Preferably the current regulating means comprises a thyristor. These are relatively inexpensive and require only a small initial operating current meaning that it can easily be directly controlled by a microprocessor.

The current regulating means is preferably provided in series with the coil, so that it regulates the current flowing through the coil and the second heater.

The electromagnetic switching means may be operative both to reduce or interrupt power to the heating means and to restore it again, by suitably controlling current through its coil. In preferred embodiments however the electromagnetic switching means is operative only to interrupt or reduce power to the heating means but not to restore power thereto. In other words the electromagnetic switching means does not behave like a normal on/off electromagnetic relay but instead acts as a 'trip' mechanism so that when current through the coil is interrupted or reduced below a threshold, a set of contacts will be opened; but the contacts are not re-closed by re-establishing the current through the coil. This provides a safety function in that some kind of external—e.g. manual reset is required to reconnect power to the heating means after the electromagnetic switching means has operated.

Preferably the electromagnetic switching means comprises means for applying a force tending to open the associated contacts, which force must be overcome to close or hold closed the contacts. The force required to close the contacts will be greater than the coil is able to exert when the contacts are already open; but the force required to hold them closed will be within what the coil exerts. The contacts must therefore be physically closed by other means. This feature is considered novel and inventive in its own right in the context of a liquid heating vessel and thus when viewed from a further aspect the present invention provides an electromagnetic switching arrangement for controlling the supply of electrical power to heating means of a liquid heating vessel, said switching means comprising a coil arranged to hold a pair of contacts closed when a predetermined current passes therethrough; wherein the contacts are arranged to open upon the current being interrupted or reduced but wherein the contacts are not re-closed when current through the coil is restored.

This arrangement provides a simple control for a heater wherein an external resetting action is required to switch back on after the mechanism has tripped off. The arrangement is distinct from incorporating a set of relay-operated contacts in series with the coil of the relay which is a well-known arrangement for latching a relay. Here the contacts must be physically re-closed by means other than the coil after they have opened.

The switching off of the electromagnetic switching means and thus the interruption or reduction of power to the heater can be achieved very easily by interrupting or reducing or interrupting current to the coil. Since the electromagnetic switching means is preferably biased such that it only releases and allows the contacts to open without being required to re-close them, the necessary electromagnetic force is relatively low. This has advantages in the current and size of coil required and therefore the cost. Furthermore the small coil can be integrated more easily with a control, in particular with an electronic control.

The force tending to open the contacts could be applied by the weight of a component—e.g. part of the electromagnetic switching means itself. Preferably however resilient means are provided—e.g. a spring acting on part of the switch or even inherent resilience in the contacts themselves.

The biased switching arrangement described above is also beneficial where a second heater is connected in series with the coil since it means that after the main heater has been de-energized, the current through the secondary heater can be chosen to give a desired heating effect without the possibility of the contacts associated with the electromagnetic switching means reclosing and thus re-energising the main heater.

Another advantage of such arrangements is that the contacts will remain open however they are opened—i.e. even if the control means has not detected the predetermined temperature condition and so current continues to flow through the coil. Preferably therefore the contacts are acted upon by an thermomechanical actuator such as a snap-acting bimetallic actuator. This will have the effect of ensuring that the main heater is de-energized if the vessel overheats regardless of the state of the electronic control. This clearly enhances the safety of the vessel.

Re-closing of the contacts in accordance with the foregoing arrangements may be achieved by any suitable means but preferably an operating member is provided which allows a user to re-close them manually. The control means is preferably arranged to ensure that when the contacts are re-closed, current flows in the coil so that they will be held closed.

The operating member is preferably a pivotally mounted lever. The lever may be made of any suitable material or combination of materials for example it could be of metal—e.g. if it is required to experience high temperatures in use without distorting. Currently preferred however is for the lever to be of plastics material for reasons of simplicity and cost-effectiveness of manufacture.

Preferably, the vessel is cordless—i.e. the vessel proper is seated on a cordless base which is connected to the mains electrical supply, corresponding cordless connector parts being provided on the base and vessel to provide power to the latter. Preferably, the connector parts are such as to provide power to the vessel irrespective of the relative angular orientation of the vessel and base—i.e. the cordless connectors are preferably of the so-called 360° type.

It will be appreciated that in the cordless arrangements set out above, when the vessel is lifted from the power base the current in the coil of the electromagnetic switching means will be interrupted. Where, as is preferred, the switching means is arranged only to latch the corresponding contacts closed, this means that heating can only be re-commenced by replacing the vessel on the power base and manually re-closing the contacts. This could be arranged to happen automatically when the vessel is replaced but preferably the heater must be switched on again by a user-operated switch.

The main heating means may comprise a thick film heater. The second heating means may then, if provided, be a separate heater track section of the thick film heater, connected electrically in parallel with the main heating track section. The main heating means though preferably comprises a sheathed heating element. Similarly, where provided the second, keep-warm heater could be thick film or sheathed. In one set of preferred embodiments the main heating means comprises a sheathed heating element and the second heating means comprises a resistor in the form of an elongated resistance around an insulating core.

Preferably the resistor comprises a wire-wound resistor. Such resistors typically comprise a resistance wire wound around an insulating (e.g. ceramic) core and usually covered with an insulating sleeve, although this is not essential. They are widely available and normally used as discrete components in electronic circuits where a slightly higher than usual power dissipation is required e.g. for use in an amplifier. They are typically rated at a few Watts in free air.

However, the Applicant has appreciated that when used in the context of the present invention, i.e. in close thermal contact with a heater base which is itself in close thermal contact in use with a liquid such as water, the water acts as a very efficient heat sink, so allowing the resistor to operate continuously at a much higher power—e.g. 60 Watts or so which is the sort of power required to keep water in a typical water boiling vessel warm but not boiling.

It is preferred at least partially, and preferably fully, to encapsulate the resistor in a thermally conductive material. This improves heat transfer to the liquid. Preferably, however, the resistor is received in an enclosure mounted to the base and filled with a suitably thermally conductive filler material. The material should have a sufficiently high thermal conductivity to prevent the resistance overheating. Preferably the thermal conductivity of the material is greater than 5 Watts per meter per Kelvin (W/m/K), more preferably greater than 10 W/m/K, more preferably greater than 15 W/m/K.

However the thermal conductivity is not the only consideration. The Applicant has found that preferably the thermal expansion of the filling should be as close as possible to the thermal expansion of the enclosure. This helps to ensure that no or very little air gap is created as the heater heats up during operation which would adversely affect the conduction of heat away from the resistance. For example where the enclosure is made from aluminum, as is preferred, it will have a coefficient of thermal expansion of approximately 23 parts per million per OC (ppm/° C.). In these circumstances the filler preferably has a coefficient of greater than 8 ppm/° C., more preferably greater than 12 ppm/° C. Preferably the filler comprises magnesium oxide e.g. as a powder, putty or slurry. One example of a suitable filler material is Ceramic 10 MgO compound available from Sauereisen of Pittsburgh, Mass., USA. This has a thermal conductivity of 17-28 W/m/K and an expansion coefficient of 9 ppm/° C. Ceramic 33S, also available from Sauereisen is suitable as well. It has a thermal conductivity of 8-10 W/m/K and an expansion coefficient of 14 ppm/° C. Ideal would be a compound having a thermal conductivity similar to that of Ceramic and an expansion coefficient similar to that of Ceramic 33S.

Preferably the resistor has a design power rating in free air of less than 10 Watts, preferably between 5 and 10 Watts and preferably approximately 7 Watts. Similarly the resistance of the resistor is preferably greater than 750 Ohms, preferably between 750 Ohms and 1.25 kilohms, preferably approximately 1 kilohm.

DESCRIPTION OF THE DRAWINGS

Some preferred embodiments of the invention will now be described by way of example only and with reference to the accompanying drawings in which.

DETAILED DESCRIPTION OF THE INVENTION

Figure 1:
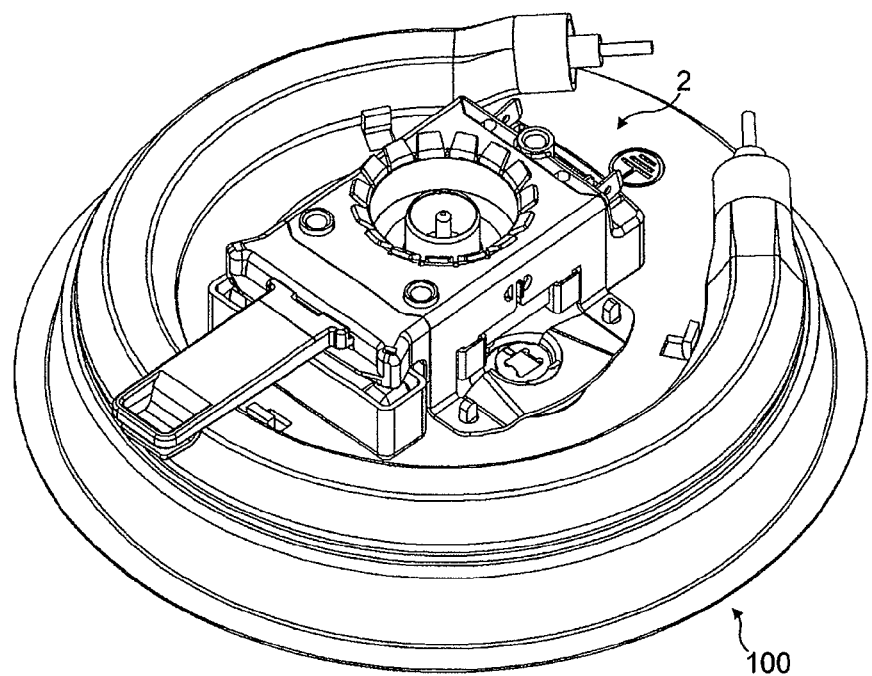
FIG. 1 is a perspective view of the underside of a vessel base with a control unit fitted embodying the invention.
Figure 2:
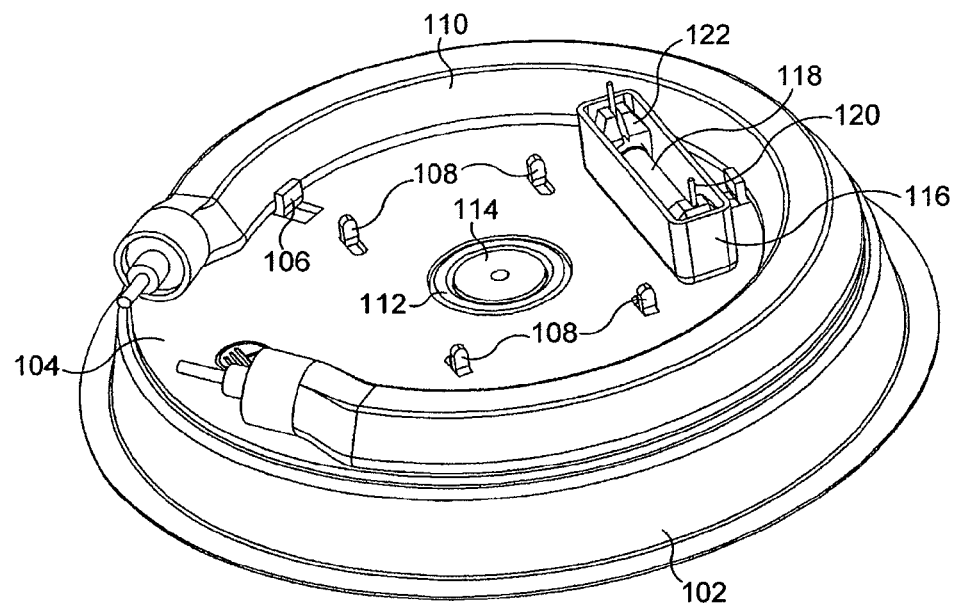
FIG. 2 is a view of the base (rotated through approx 180 degrees) with the control unit removed.

FIG. 1 shows a control unit 2 which is mounted to an underfloor heater 100 shown more clearly in FIG. 2. The underfloor heater (shown inverted from its in-use orientation for the purposes of explanation) comprises a dish-shaped stainless steel plate 102 which is designed to be mounted so as to close an opening in the base of a liquid heating vessel. Any convenient mounting method may be used. For example although not shown the plate 102 could be provided with an upwardly open peripheral channel to enable it to be fixed using the Applicant's Sureseal fixing system described in greater detail in WO 96/18331.

Brazed to the underside of the plate 102 is an aluminum heat diffuser plate 104. A number of tabs 106, 108 are released from this: respectively to locate a conventional sheathed heating element brazed to the diffuser plate 104; and to attach the control unit 2.

In the center of the stainless steel plate 102 is an annular wall 112 created by a corresponding annular channel on the water side of the plate. Inwardly of this wall 112 is a separate disc 114 of the diffuser plate material. The extra diffuser section 114 is thus unconnected to, and thermally isolated from, the heating element 110.

Also attached to the diffuser plate, e.g. by welding is a narrow rectangular enclosure or trough 116, which is also of aluminum. Disposed in the trough 116 is a standard off-the-shelf 1 kilohm wire-wound resistor 118 which has a free-air rating of 7 Watts. The leads of the resistor 120 are bent at right angles so as to extend vertically up. A pair of ceramic caps 122 is provided at either end of the resistor 118 to retain it firmly in the trough 116 and to insulate the leads 120 from the walls of the trough. Although not shown in the Figure, thereafter the trough 8 is filled with compacted Ceramic magnesium oxide putty available from Sauereisen, Pittsburgh, Mass., USA. The filler has a thermal expansion coefficient similar to that of the aluminum. The filler helps to enhance thermal transfer from the resistor 118 to the trough 116 and the base 102. This allows the resistor to be operated at nearly ten times its free-air rated power.

Figure 3:
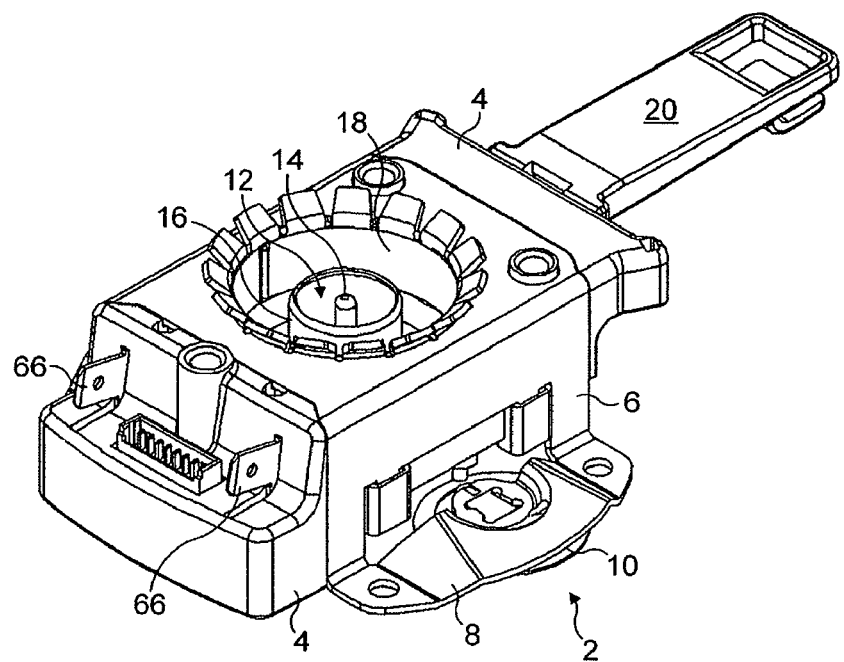
FIG. 3 is a perspective view of the control alone.
Figure 4:
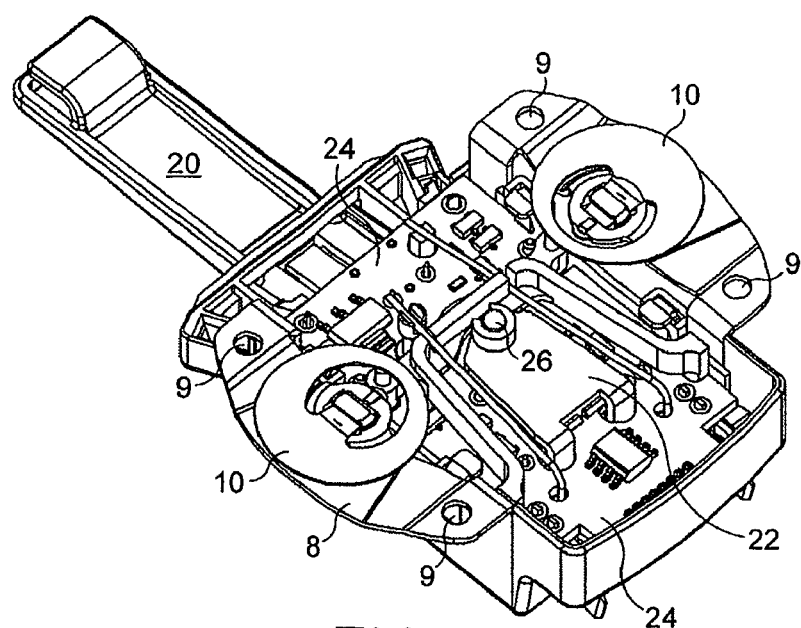
FIG. 4 is a perspective view of the upper side of the control.

FIG. 3 shows the control unit 2. FIG. 4 is a view from beneath of the same control. The control 2 comprises a moulded plastics body 4 to which is attached a metal mounting bracket 6. The mounting bracket 6 extends over three sides of the control body and has two wing sections 8 at either side. These each have a pair of holes 9 through which the tabs 108 released from the diffuser plate 104 project and are twisted in order to secure the control unit 2 is secured to the base.

The wing sections 8 each mount a snap-acting bimetallic actuator 10 so as to hold the same in good thermal contact with the diffuser plate 104. In the underside of the control unit 2 (i-e. uppermost in the inverted view of FIG. 1) is an opening providing access to the male terminal members of a 360° cordless connector 12. The cordless connector 12 comprises a central live pin 14, a concentric neutral ring 16 and a further concentric earth ring 18. These receive power in use from a corresponding connector part on a cordless base (not shown) which is connected to the mains electrical supply.

Also visible in both FIGS. 3 and 4 is a manual operating lever 20 which extends from the rear of the control unit and when in use will pass through the vessel body and have a knob (not shown) connected to the end for operation by a user.

Turning to FIG. 4, there may be seen a printed circuit board (PCB) 24 mounted in the plastic body moulding 4. Mounted to PCB is a resilient support bracket 22 which carries a bead type thermistor 26 so as to press it resiliently against the vessel base between the two bimetals 10. The bracket 22 also makes an electrical connection to one side of the thermistor 26, the other electrical connection being made to earth through the vessel base itself.

An electromagnetic switching arrangement will now be described with reference to FIGS. 5 to 10.

Figure 5:
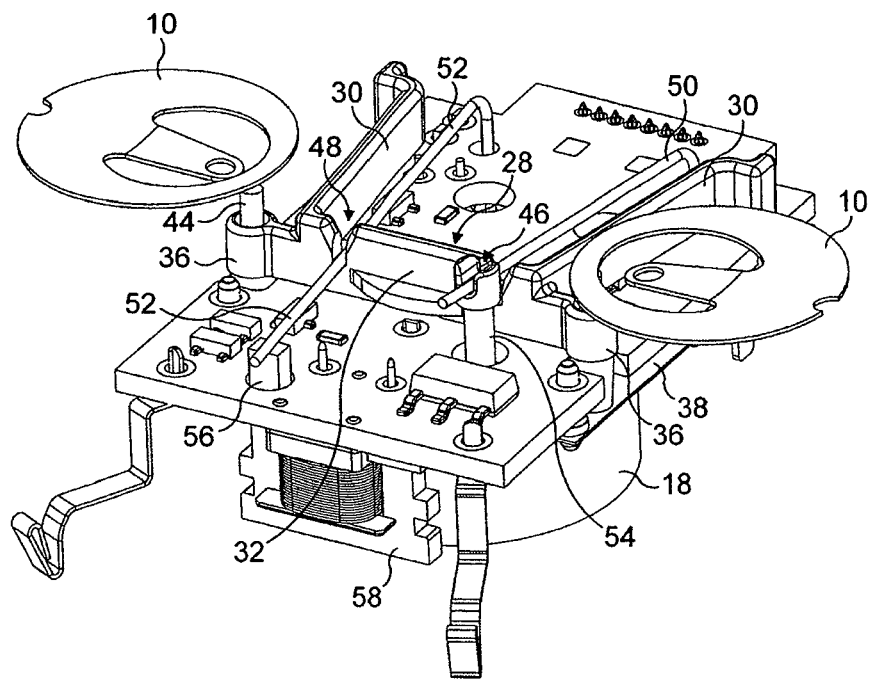
FIG. 5 is a view from above of the trip lever and associated components.
Figure 6:
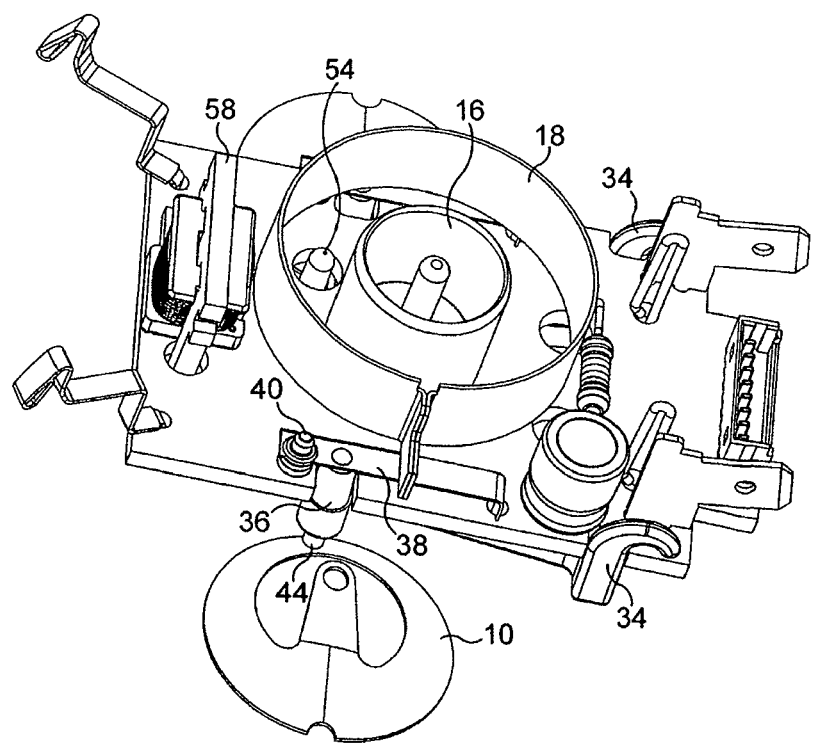
FIG. 6 is a view similar to FIG. 5 from another angle.
Figure 7:
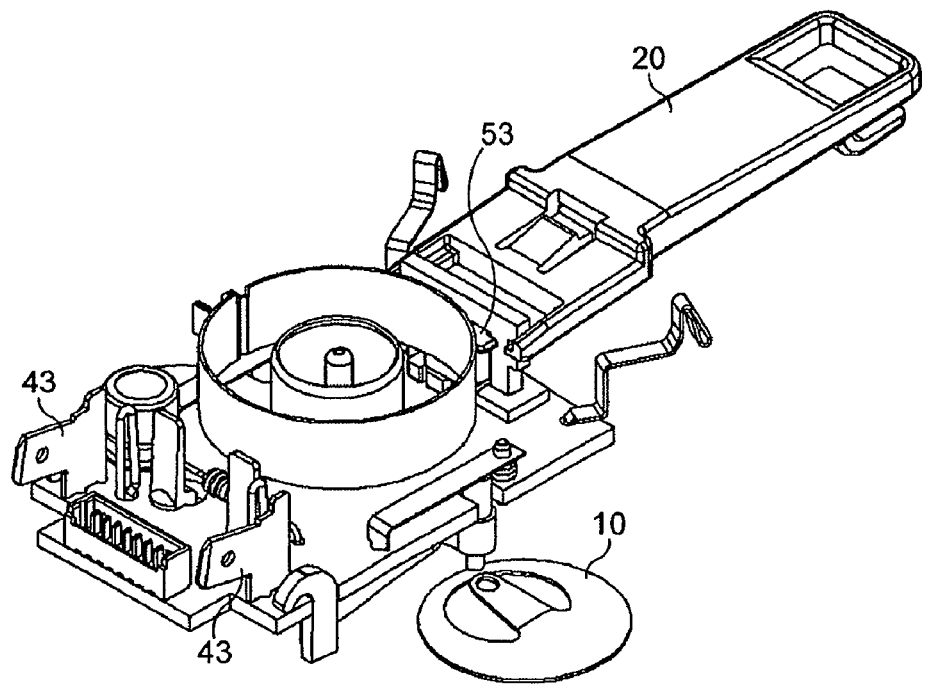
FIG. 7 is a view similar to FIG. 5 from another angle and including the manual operating lever.
Figure 8A:
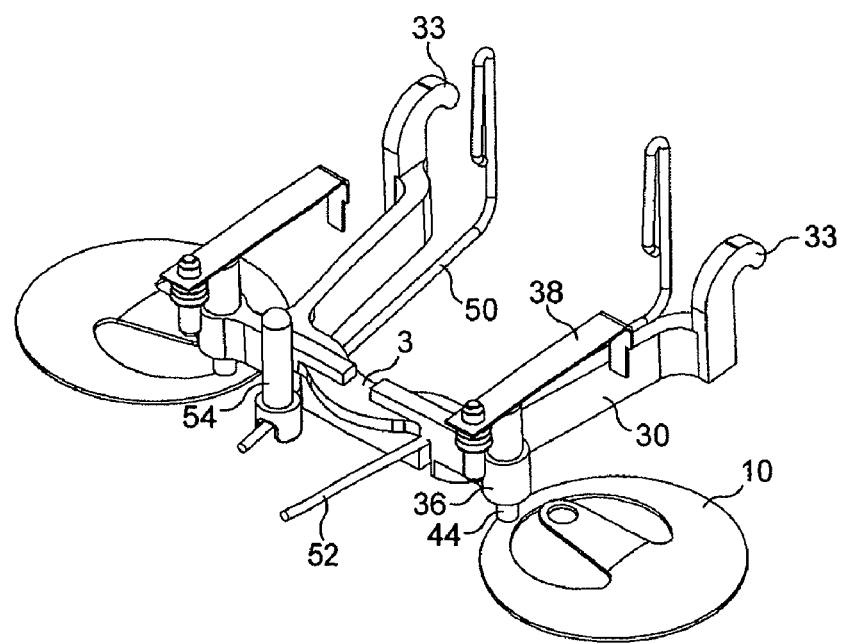
FIGS. 8*a* and 8*b* are views from two different angles of the trip lever.
Figure 8B:
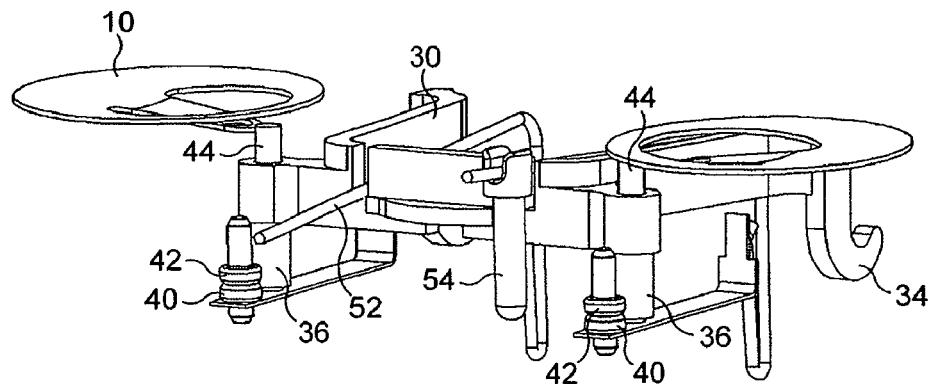
Figure 9:
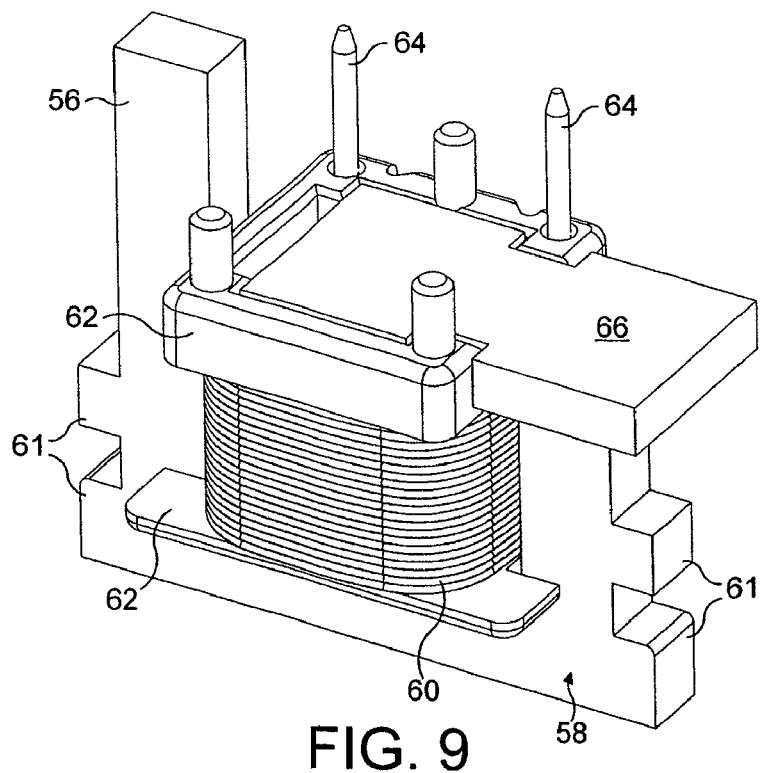
FIG. 9 is an enlarged perspective view from beneath of the solenoid assembly.
Figure 10:
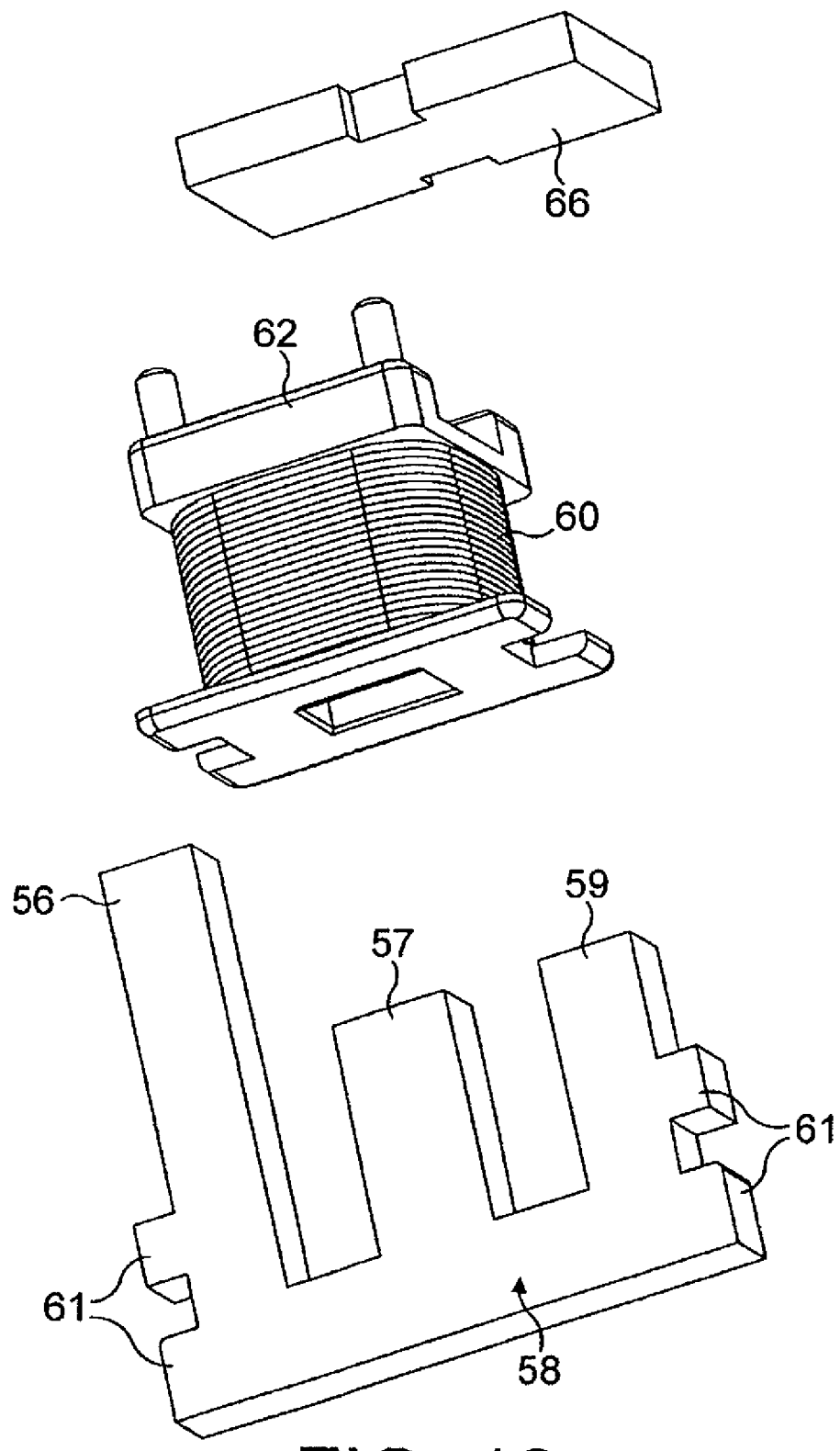
FIG. 10 is an exploded view of the solenoid assembly.

FIGS. 5 to 7 show views of the upper part of the control with the body moulding and several other parts removed. FIGS. 8*a* and 8*b* show the trip lever in greater detail and FIGS. 9 and 10 show the solenoid in greater detail.

The electromagnetic switching mechanism is centered around a pivoting trip lever 28. The trip lever 28 comprises two side arms 30 which are connected by a central cross portion 32. The other ends of the respective arms 30 are formed into hooks 34 which as will be seen in FIG. 6 pass through the circuit board 24 and allow a small degree of pivoting movement.

At the corners where the side arms 30 meet the central cross portion 32, cylindrical collars 38 extend downwardly through notches at the edge of the circuit board 24 so that, depending on the pivot angle of the trip lever 28, they may be bought into physical contact with respective leaf springs 38. The leaf springs 38 each carry a separately attached electrical contact member 40 as their distal ends which, in the natural state of the springs 38, are held together so as to make good electrical contact with corresponding contact members 42 which are fixed to the circuit board. When the trip lever 28 is pivoted forward however, the collar portions 36 bear on the leaf springs 38, moving them downwardly and opening the two pairs of contacts 40, 42.

The contact leaf springs 38 are connected electrically to a pair of spade terminals 43 which are connected in use to the cold tails of the main heating element 110 by means of flying leads (not shown). The fixed contacts 42 are connected through the PCB 24 to the live pin 14 and neutral ring 16 respectively of the cordless connector. The contact pairs 40, 42 thus provide dual-pole switching of power to the heating element 110.

The hollow collars 36 slidingly accommodate respective push rods 44 which are acted on by the two snap acting bimetallic actuators 10. This allows the bimetals 10 to open the contacts 40, 42 by means of the associated push rod 44 independently of movement of the trip lever 28.

The cross member 32 of the trip lever is formed with two approximately V-shaped notches 46, 48 which can receive respective wire springs 50, 52 that are anchored to the circuit board 24. The end of one of the springs 50 (the leftmost one in FIGS. 5 and 8*b*) rests in a slot formed at the end of a sliding pin 54 which passes through the circuit board 24 and projects between the neutral and earth rings 16, 18 of the 360° connector. This means that when the control unit is placed on a corresponding cordless base connector part the sliding pin 54 will be pushed upwardly so that the corresponding wire spring 50 is held away from the notch 46 in the trip lever cross member 28. Conversely, when the vessel is lifted from its cordless base, the sliding pin 54 no longer offers any resistance to the wire spring 50 which presses the pin 54 down so that it projects into the space inside the connector 12. This also allows the wire spring 50 to engage the notch 46 in the trip lever and provide sufficient force to pivot it forward which causes the hollow collars 36 to bear on the contact leaf springs 38 thus opening the two pairs of contacts 40, 42. This provides a so-called lift-off, switch-off (LOSO) function that ensures the vessel will only be powered if it is properly seated on its cordless base. The sliding pin 54 which gives this function will hereafter be known as the LOSO pin.

The end of the wire spring 52 on the other side of the control rests on an extended arm 56 of the core member 58 of a solenoid. The solenoid is shown in more detail in FIGS. 9 and 10. It comprises a coil 60 which is wound around a former 62 and which is terminated by electrical connection pins 64. The core member 58 is approximately E-shaped and is able to move vertically so that its center arm 57 can move further into and further out of the center of the coil 60. The third arm 59, on the opposite side of the core member to the extended arm 56, is disposed just outside the coil to one side.

An iron keeper member 66 fits beneath the former 62 and extends to the side so that when the core member 58 is fully inserted into the coil 60 (see FIG. 9), both the center arm 57 and the aforementioned side arm 59 make contact with it. When current flows in the coil 60 therefore, a tightly defined magnetic field will be set up around the closed loop so formed which is sufficient to hold the core member 58 in this retracted position against its weight and the biasing force of the wire spring 52.

In moving the extended arm 56 of core member down, the wire spring 52 will also engage the notch 48 in the cross member 32 of the trip lever and will therefore pivot it forward so as to open the two pairs of contacts 40, 42 just as when the same contacts are opened by releasing the LOSO pin 54.

When the current is stopped or falls below a threshold value, the magnetic field will rapidly decay so that the core member will be moved down, partly out of the coil 60 under gravity and the action of the spring 52. In this protruding position the separation between the core member 58 and the keeper 66 means that there is insufficient mutual magnetic attraction to pull the core 58 back up into the coil even if the coil current is fully restored.

The solenoid arrangement therefore provides a tripoff function which requires the core member 58 to be manually returned to the retained position in FIG. 9. This return is achieved by means of the manual operating lever 20 which is coupled to formations 61 on the core member so that as the lever 20 is pressed down the keeper 58 is pushed up into the coil 60 (see FIG. 7). As will be explained later, the control is arranged to restore current to the coil when the contacts 40, 42 are manually re-closed; so the action of the user pressing down on the manual operating lever 20 will be to restore the core member 58 to its inserted position, close the two sets of contacts 40, 42, energize the main heater 110 and energize the coil 60 of the solenoid to keep the contacts closed. Equally, the operating lever 20 may be pressed up by user which will manually pull the core member 58 out of the coil 60, allowing the wire spring 52 to press downwardly on the trip lever 28 and open the two sets of contacts 40, 42 which will then remain open until the lever is pressed down to reset as described above. The lever 20 may therefore be used for manually turning the main heater off and on respectively.

The relative spring forces of the two wire springs 50, 52 and the magnetic attraction force of the solenoid 58, 60, 66 are chosen so that when the LOSO pin 54 is released the combined force of the two springs 50, 52 will always be enough to move the core member 58 out of the coil away from the keeper 66 and therefore deenergize the main heater 110 requiring a manual reset. This avoids a situation for example where the user pours water out of the vessel once it is boiled and then replaces it without switching off the vessel so that the heater is run dry which would cause it to overheat.

Figure 11:
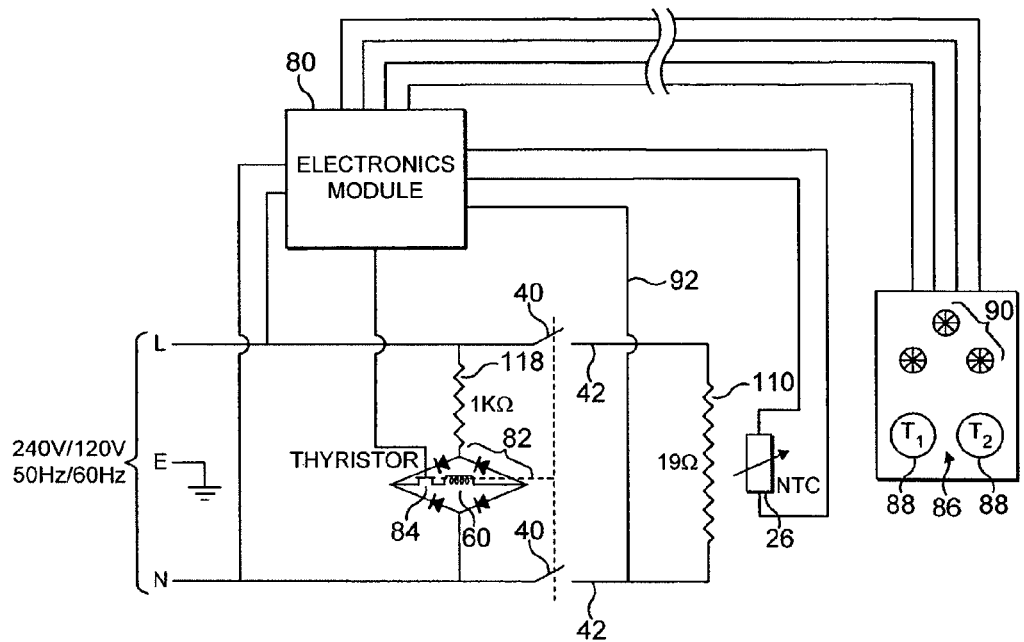
FIG. 11 is a schematic circuit diagram for the vessel.
Figure 12:
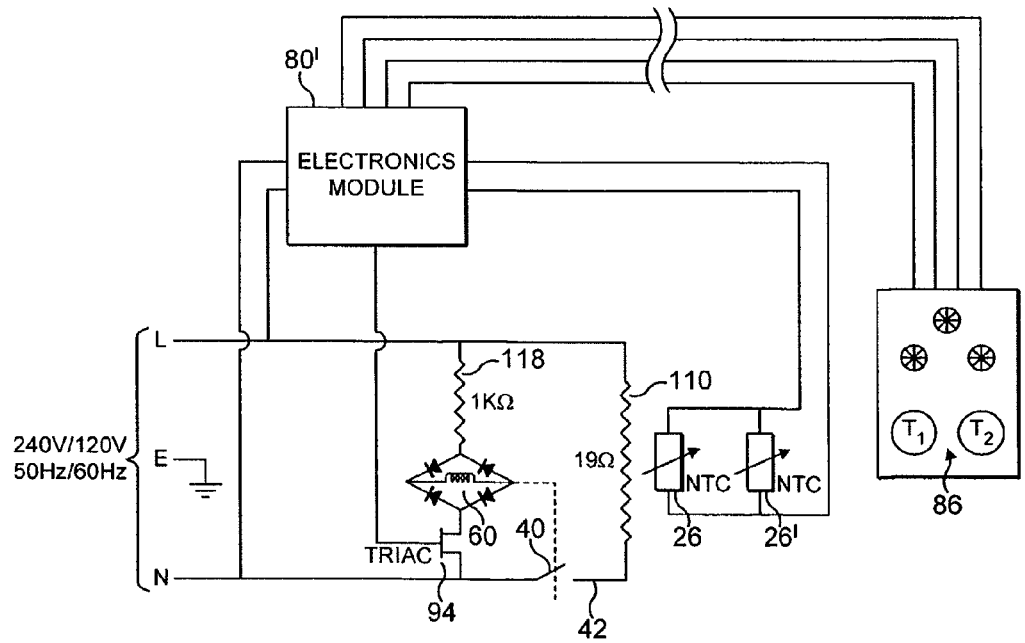
FIG. 12 is a schematic circuit diagram for another embodiment of the invention.

FIG. 11 is a schematic circuit diagram for the control unit. At the left-hand side of the diagram are the live and neutral mains connections which are of course made by means of the central pin 14 and concentric terminal member 16 of the cordless connector. The live and neutral poles are connected through respective contact pairs 40, 42 to the main sheathed heating element 110 as may be seen.

An electronics module 80 is also connected, unswitched, across the live and neutral poles. The function of the electronics module 80 will be described in greater detail below but the module does include its own power supply arrangement for converting from the 240 volts AC mains supply to a 5 volts DC smoothed and regulated supply suitable for a microprocessor.

Also connected across the live and neutral poles is a serial arrangement of the wire-wound resistor 118 forming the keep-warm heater and a bridge rectifier arrangement 82. Connected in series across the two arms of the rectifier 82 are the solenoid coil 60 and a thyristor 84, the gate of which is connected to the electronic module 80.

Also connected to the electronics module 80 are the thermistor 26 and a user interface module 86 comprising two temperature control buttons 88 and various LED indicator lights 90. Finally, there is a further connection 92 from the electronics module 80 to the neutral side of the main heating element. This allows the module 80 to determine whether a voltage has been applied across the main heating element 110 in order to energize it.

Operation of the vessel will now be described. The user begins by filling the vessel with water and replacing it on its cordless base (not shown). This supplies power through the cordless connector part 12 on the underside of the vessel and therefore, as may be seen in FIG. 11, the electronics module 80 and user interface module 86 will be powered. Indeed, one of the indicator LEDs 90 on the user interface may be lit to indicate that the vessel is in a stand-by condition. The user may then press one of the temperature buttons 88 in order to select a pre-determined temperature to which to heat the water. For example, these could be set to be 40° C. which would be a suitable temperature for warming baby milk and 85° C. for brewing coffee. Alternatively if the user does not press either of the temperature buttons, the water will be allowed to boil.

The user initiates actual heating of the water by pressing downwardly on the end of the manual operating lever 20. This pushes the core member 58 into the coil 60 off the solenoid against the keeper 66 and, through the extended arm 56 thereof, holds the wire spring 52 away from the central portion 32 of the trip lever thereby allowing the contact leaf springs 38 to close the contact pairs 40, 42. Current will therefore flow through the main heating element 110 which will therefore begin to heat.

Closure of the two pairs of contacts 40, 42 is detected by the voltage seen at the connection 92 to the electronics module 80. The electronics module 80 then issues a signal to turn of the thyristor 84 which causes a current to flow through the coil 60 of the solenoid which retains the core member 58 in place and so permits the two contact pairs 40, 42 to remain closed and therefore the heating element 62 to continue heating. Since the keep-warm heater resistor 70 is in series with the rectifier 82 powering the solenoid's coil 60, current will also flow through this causing it to heat as well.

The temperature of the water is continuously monitored by the resistance of the thermistor 26 giving rise to a corresponding signal which is monitored by the electronics module. If the user has pre-set a temperature by means of one of the buttons 88 on the user interface, the liquid temperature will continue to be monitored until that temperature is reached. Alternatively, if neither of the projected temperatures was selected then the electronics module will monitor the rate of change of temperature indicated by the thermistor 26 from which it may be determined that the water is boiling since the rate of change of temperature will fall from a relatively constant value during heating as the water approaches boiling point. A suitable threshold rate of change is chosen to ensure that the water is boiling.

Whichever of the aforementioned temperature conditions is being monitored, when it is met the electronics module 80 switches off the signal to the gate of the thyristor 84 which substantially stops current flowing through the coil 60 of the solenoid and therefore the magnetic field it generates will collapse and will no longer apply an attractive force to the core member 58. The latter will therefore be pushed downwardly, away from the coil by the action of the wire spring 52. In doing so, the wire spring 52 will also engage the notch 48 in the cross member 32 of the trip lever thereby pivoting it forwardly and opening the two sets of contacts 40, 42 which interrupt power to the main heating element 110 so that it ceases heating. This operation will be evident to the user since the manual operating lever 20 will be pivoted so that the back end visible by the user is raised up.

If the user had not selected one of the pre-set temperatures but rather had opted to boil the water, no further heating is applied and the water will slowly begin to cool. However, it will be seen that the water can easily be re-boiled simply by pressing down again on the operating lever 20 to recommence the operating explained above.

If, however, the user has selected a pre-set temperature through one of the corresponding buttons 88, after power to the main element 62 has been disconnected by allowing the trip lever 28 to trip and open the contacts 40, 42, the thyristor 84 is again switched on to energize the keep-warm heater resistor 118. This dissipates approximately 60 watts at 240 volts which slowly heats the water. During this phase of the operation, the thermistor 26 continues to be employed to measure the temperature of the water so that the electronics module 80 can switch the thyristor 84, and therefore the keep-warm heater 118, on and off thermostatically in order to maintain the desired temperature. It will be appreciated that when the keep-warm heater 118 is energized, current will also flow through the coil 60 of the solenoid. However, since the core member 58 is separated from the keeper 66 at this stage, the contacts 40, 42 will remain open since the magnetic field generated by the coil 60 is insufficient to attract the core member back into the coil.

The water in the vessel will continue to be maintained at the desired temperature in this way until the vessel is lifted from its base which causes the electronics module 80 to reset itself.

If the vessel is operated without any water in it or there is some form of malfunction of the controlled unit which allows the vessel to boil dry, the temperature of the heating element 110 will continue to rise above its normal operating temperature. This overheating of the element 110 will be sensed by one or both of the bimetals 10 via the heat diffuser plate 104 causing it or they to reverse curvature in a snap action and open the corresponding pair of contacts 40, 42 via the push rod 44 pressing on the contact leaf spring 38. The connection 92 between the electronics module 80 and the neutral side of the main element 110 allows the electronics module to detect that abnormal interruption of the power to the element 110 has taken place. The electronics module 80 responds by switching off the thyristor 84 and therefore tripping off the trip lever 28 to maintain the contacts 40, 42 open. The contacts will thereafter remain open until the user manually resets them through the operating lever 20. It will be appreciated further that even if all of the electronic components were to fail to operate, the bimetals 10 would nonetheless ensure that the element 110 could not reach a dangerously high temperature.

Similarly, if the vessel is lifted from its cordless base during heating the current through the coil 60 the solenoid will be interrupted, causing the trip lever 28 to trip off and thereby requiring a manual reset of the operating lever 20 by the user before heating can recommence.

A schematic circuit diagram of a second embodiment of the invention is shown in FIG. 11. Throughout items corresponding to those described with regard to the first embodiment are given identical numerals and are not described further.

There are three main differences displayed in this embodiment as compared to the first. Firstly, two thermistors 26, 26' are provided in parallel with one another. This allows a more accurate measurement of temperature to be made by effectively averaging the measurement of each. They could, for example, be located at different parts of the base in order that local fluctuations in temperature do not adversely affect the accuracy of the temperature measurement.

Another difference is that rather than the current through the coil 60 of the solenoid being controlled by a thyristor in series with it, the current is instead controlled by a triac 94, the trigger of which is connected to the electronics module 80'.

A further difference over the first embodiment is that power to the main heating element 110 is controlled by contacts 40, 42 in the neutral pole only.

It will be appreciated by those skilled in the art that many variations and modifications to the embodiments described above may be made within the scope of the various aspects of the invention set out herein.

What is claimed is:

1. A liquid heating vessel comprising a heater for heating liquid in the vessel provided on the underside of the base of the vessel, an electronic control, an electromagnetic switch for interrupting or reducing power to the heater, and a temperature sensor for providing a signal dependent on the temperature of liquid in the vessel to the control, the control being arranged to operate the electromagnetic switch to interrupt or reduce power to the heater in response to the control determining that a pre-determined temperature condition has been reached, wherein said electromagnetic switch comprises a pair of contacts configured to be normally open, and a coil arranged to hold the contacts in a closed position, after initial closure, when a predetermined current passes through the coil, and wherein the contacts are arranged to open upon the predetermined current to the coil being interrupted or reduced, and wherein a force produced by the predetermined current passing through the coil is adequate to maintain the contacts closed, but such force is inadequate to re-close the contacts when the predetermined current through the coil is restored.

2. A vessel as claimed in claim 1, wherein the temperature sensor is mounted so that its signal is indicative of the temperature of the liquid being heated in the vessel.

3. A vessel as claimed in claim 1, wherein the temperature sensor is in good thermal contact with the vessel base, the base being configured so as at least partially to isolate the temperature sensor from the heater.

4. A vessel as claimed in claim 1, wherein the temperature sensor is provided on or against a sensing region of the heated base which is not provided with a heat diffuser.

5. A vessel as claimed in claim 4, wherein the sensing region is at least partly surrounded by a wall.

6. A vessel as claimed in claim 5, wherein the wall is defined by a channel on the liquid side of the heater.

7. A vessel as claimed in claim 1, further comprising means for allowing a user to select a preset mode of operation wherein the control determines when the water temperature has reached a preset temperature.

8. A vessel as claimed in claim 1, wherein at least one thermo-mechanical actuator is provided in order to protect against overheating.

9. A vessel as claimed in claim 8, wherein said actuator is a snap-acting bimetallic actuator.

10. A vessel as claimed in claim 1, wherein the pre-determined temperature condition comprises a rate of change of temperature.

11. A vessel as claimed in claim 1, wherein the base of the vessel is provided with a second, lower power, heater for keeping liquid in the vessel warm.

12. A vessel as claimed in claim 11, wherein the heater comprises a resistor in the form of an elongated resistance around an insulating core.

13. A vessel as claimed in claim 12, wherein the resistor comprises a wire-wound resistor.

14. A vessel as claimed in claim 12, wherein said resistor is at least partially encapsulated in a thermally conductive material.

15. A vessel as claimed in claim 12, wherein the resistor is received in an enclosure mounted to the base plate and filled with a thermally conductive filler material.

16. A vessel as claimed in claim 12, wherein the resistor has a design power rating in free air of less than 10 Watts.

17. A vessel as claimed in claim 11, wherein the second heater is connected in parallel with the main heater.

18. A vessel as claimed in claim 11, wherein the second heater is connected electrically in series with the electromagnetic switch.

19. A vessel as claimed in claim 1, wherein the electromagnetic switch requires an external reset in order to restore power to the heater after power thereto has been interrupted or reduced.

20. A vessel as claimed in claim 1, wherein the electromagnetic switch comprises an arrangement for applying a force to hold the contacts in the normally open position.

21. A vessel as claimed in claim 20, wherein the arrangement comprises a resilient arrangement.

22. A vessel as claimed in claim 20, wherein the contacts are acted upon by a thermo-mechanical actuator.

23. A vessel as claimed in claim 20, wherein an operating member is provided which allows a user to re-close the contacts manually.

24. A vessel as claimed in claim 20, wherein the control is arranged to ensure that when the contacts are re-closed, current flows in the coil so that they will be held closed.

25. A vessel as claimed in claim 1, wherein the vessel is cordless.

26. A vessel as claimed in claim 1, wherein the main heater comprises a sheathed heating element.

27. A vessel as claimed in claim 1, wherein the temperature sensor is provided on or against a sensing region of the heated base which has a heat diffuser portion which is not connected to a main heat diffuser in good thermal contact with the heater.

28. An assembly for a liquid heating vessel comprising: a first heater for heating liquid in the vessel and a second heater of lower power than the first; the assembly further comprising a control arrangement including an electromagnetic switch for interrupting or reducing the power to the first heater and comprising a coil for effecting said switching; wherein the second heater is connected electrically in series with said coil.

29. A vessel comprising an assembly as claimed in claim 28.

30. A liquid heating vessel comprising a heater for heating liquid in the vessel provided on the underside of the base of the vessel, an electronic control, an electromagnetic switch for interrupting or reducing power to the heater, and a temperature sensor for providing a signal dependent on the temperature of liquid in the vessel to the control, the control being arranged to operate the electromagnetic switch to interrupt or reduce power to the heater in response to the control determining that a pre-determined temperature condition has been reached, wherein said electromagnetic switch comprises a coil arranged to hold a pair of contacts closed when a predetermined current passes therethrough and wherein the contacts are arranged to open upon the current being interrupted or reduced but wherein the contacts are not re-closed when current through the coil is restored, wherein the base of the vessel is provided with a second, lower power, heater for keeping liquid in the vessel warm, wherein the second heater is connected electrically in series with the electromagnetic switch, wherein the current to or the coil of the electromagnetic switch is controlled by a current regulator responsive to a signal from the electronic control.

31. A vessel as claimed in claim 30, wherein the current regulator comprises a thyristor.

32. A vessel as claimed in claim 30, wherein the current regulator is provided in series with the coil.

33. An electromagnetic switching arrangement for controlling the supply of electrical power to a heater of a liquid heating vessel, including a switch comprising a pair of contacts configured to be normally open, and a coil arranged to hold the contacts in a closed position, after initial closure, when a predetermined current passes through the coil, and wherein the contacts are arranged to open upon the predetermined current to the coil being interrupted or reduced, and wherein a force produced by the predetermined current passing through the coil is adequate to maintain the contacts closed, but such force is inadequate to re-close the contacts when the predetermined current through the coil is restored.

* * * * *